Patented Aug. 10, 1937

2,089,552

UNITED STATES PATENT OFFICE 2,089,552

IMPRESSION MATERIAL AND METHOD FOR MAKING IMPRESSION MATERIAL

Laurence E. Harrison, Prescott, Ariz., assignor to Oramold Products Corporation, West Hollywood, Calif., a corporation of Nevada No Drawing. Application October 14, 1935, Serial No. 44,999

3 Claims. (Cl. 18—47)

This invention relates to an impression or molding material suitable for use by dentists or dental technicians in making impressions of the teeth and gums, and which may also be used for other purposes such as the making of impressions or molds of any desired object in order to permit castings to be made which accurately reproduce the shape and surface detail of such object.

The principal object of the invention is to provide an impression material having a reversible gel-forming organic hydrocolloid as a base and adapted for the molding of models from plaster of Paris or the like, provided with a highly advantageous electrolyte material adapted to hasten the setting of such plaster of Paris upon contact thereof with such impression material, which electrolyte material is at the same time neutral in effect upon the gel-forming hydrocolloid. For this use an alkali-metal sulphate such as potassium sulphate has been found to be particularly advantageous.

This application is a continuation-in-part of my co-pending application Serial Number 686,251, filed August 22, 1933, issued November 11, 1935, Patent Number 2,021,059.

The invention relates more specifically to that type of impression materials having an organic hydrocolloid gel base and which have plastic characteristics when heated or warmed to a temperature somewhat above atmospheric temperature, in which plastic condition they may be molded or pressed into contact with the object to be molded, as in the making of detailed dental impressions, or the like, and which become set upon chilling below a certain temperature, so as to retain the molded shape. In the set condition a material of this type is no longer susceptible to plastic deformation but retains a certain characteristic of resilience so as to permit it to give or yield when pulled from the model, thus, in dental application, permitting the removal of undercut portions of an impression or inverted wedges by a resilient non-plastic deformation of the material, which deformation is overcome by the natural resilience of the material after removal of the deforming stress, so that the impression will return or spring back to its original position after it has been removed, whereby perfect reproduction of the original structure may be obtained.

The impression material of the present invention may comprise, for some molding purposes, merely an aqueous gel such as that obtainable with agar-agar, with the desired water-soluble electrolyte material dissolved therein, but in general an impression material prepared with agar-agar or a like hydrocolloid material is of relatively low mechanical strength unless some modifying material is included in the composition. Numerous modifying materials are useful, depending upon the particular use to which the material is to be put, such as fibrous materials, waxy materials, resins, et cetera, and in the following specific example of a material the modifying agents are to be understood as exemplary only, and the use of the particular type of plaster-hardening agent of the present disclosure is not to be considered as limited to the specific example of impression composition.

I may prepare an impression material according to the present invention by dissolving from 20 to 40 ounces of a gel-forming hydrocolloid, such as agar-agar, Irish moss, gelatine, or the like, in approximately three gallons of hot water, preferably by boiling, after which from 5 to 9 fluid ounces of glycerol may be added. I then prepare a solution of a thermoplastic modifying agent such as a thermoplastic rubber isomer of a balata-like type as described in U. S. patent to Fisher, Number 1,605,180, by dissolving the same in benzol, carbon-tetrachloride or other suitable solvent. The solvent should have a boiling point sufficiently lower than that of water to permit complete evaporation thereof from the mixture, and the concentration of the solution should be such as to permit spraying or atomization thereof. This solution of the modifying agent is then added to the agar-agar solution in such amount as to provide from one to three per cent of such agent on the weight of water and agar-agar present, and is preferably added slowly, as by spraying or atomizing the solution into a strongly agitated hot agar-agar solution, a very little at a time over a relatively long mixing period. After the introduction of the modifying agent, the heating of the mixture may be continued for such time as to insure the substantially complete removal of the solvent.

A suitable amount of a plaster hardening agent is added to the mixture, preferably after mixing of the modifying agent with the agar-agar solution. Numerous plaster-hardening agents have been previously suggested in connection with an impression material having a reversible gel-forming organic hydrocolloid base, such as alum, tannic acid or the like, but it has been found that these customary plaster-hardening agents have in some cases a very deleterious effect upon the gel-forming organic hydrocolloid, particularly if such agent is used in an amount calculated to give a quite accelerated hardening of the plaster. These plaster-hardening agents cause the gel-forming hydrocolloid to persist in the sol condition at a temperature below the temperature at which they normally pass into the gel condition, thus ruining the material for impression use. I accordingly prefer to use as a plaster-hardening agent an electrolyte which will not materially alter the pH value of the sol and which has no deleterious effect on the hydrocolloid material, and I have found that sulphates of the alkali metals (potassium, sodium, lithium, et cetera) are highly advantageous. For the above mixture, therefore, I prefer to add from 3 to 9 ounces of an alkali metal sulphate.

In addition to the above ingredients I prefer to add a suitable amount of a satisfactory flavoring material, such as oil of wintergreen. I also prefer to add a small amount of a bactericidal agent, such as menthol, guaiacol or hexyl-resorcinol.

As a specific example, the proportions of the several ingredients used may be as follows:

3 gallons water (390 parts),
30 ounces agar-agar,
7 fluid ounces glycerol,
8.5 ounces rubber isomer, in the form of a 6% solution in benzol,
6 ounces potassium sulphate,
2 drams oil of wintergreen,
½ ounce menthol.

In addition to the above constituents, certain waxes may be added if desired to increase the body consistency of the material immediately preceding solidification thereof, such as beeswax, ceresin, paraffin, vegetable waxes, et cetera. Other ingredients such as resin or resinous gum may be added for the purpose of toughening or increasing the rigidity of the solidified material, but in general, I have found that substantially all the desired properties of an impression material are produced without the addition of the above-mentioned waxes, resins and the like.

During the above-mentioned incorporation of the thermoplastic rubber isomer, considerable water is evaporated from the mixture, and the temperature maintained during compounding and the duration of compounding are preferably so adjusted that the final mixture, starting with the proportions given in the above specific example, weighs approximately 15 pounds and consists substantially as follows:

11 to 12 pounds of water,
30 ounces of agar-agar,
Approximately one-half pound of glycerol,
Three-eighths pound $K_2SO_4$, and
Approximately one-half pound of thermoplastic rubber isomer or other modifying agent The method of using this material, is in general, similar to the use of impression materials now in common use. The material is preferably softened or rendered plastic by placing a quantity thereof in a suitable container and placing the container in cold water, and bringing the water to a boil in about four or five minutes. The material may then be removed from the water and is sufficiently soft and plastic throughout to permit it to be placed in the usual tray or mold and inserted in the mouth and pressed against the teeth and gums in the usual manner. At the time the material is actually inserted in the mouth, the temperature thereof may be about 40° C. or slightly higher. The compound is pressed firmly into contact with the teeth and gums and is then permitted to cool.

After solidification, the material is no longer subject to plastic deformation but may be resiliently deformed for removal so that it will yield sufficiently to permit undercut, wedged, or dovetailed portions thereof to be easily removed from the mouth and to then spring back to their original position. After removal from the mouth, it may be used for the casting or molding of reproductions in plaster, the presence of the advantageous plaster-hardening agent serving to effect an accelerated setting and hardening of such plaster adjacent the impression surfaces, and thus contributing to the formation of faithful plaster reproductions.

I claim:

1. An impression material comprising an aqueous organic hydrocolloid gel base and a plaster-hardening agent consisting of an alkali metal sulphate in aqueous solution therein.

2. The improvement in a process of compounding a plastic composition for taking impressions and forming molds for plaster casts, of the type characterized by a base of reversible plastic hydrocolloid which includes plaster-set-retardant matter, and also including a plaster-set-accelerator; which improvement comprises adding the accelerator to the batch substantially at the completion of compounding of the batch, thereby minimizing any effect of the accelerator on the composition during the process of compounding it.

3. An impression material comprising an aqueous agar-agar gel base with plaster-set-retardant material therein, and also including a plaster-set-accelerator, said material being more readily plasticizable upon heating for use by reason of said accelerator having been added substantially at the completion of compounding of the material, so that effects of the accelerator upon the composition during compounding have been minimized, as compared with the properties of a material of identical composition in which the accelerator has been added early in the course of compounding.

LAURENCE E. HARRISON.